(12) United States Patent
Seo et al.

(10) Patent No.: US 11,561,016 B2
(45) Date of Patent: Jan. 24, 2023

(54) HUMIDIFIER

(71) Applicant: Samsung Electronics Co., Ltd., Suwon-si (KR)

(72) Inventors: Beomseok Seo, Suwon-si (KR); Kyunghoon Kim, Suwon-si (KR); Sanghoon Lee, Suwon-si (KR); Seojeong Kim, Suwon-si (KR); Changmin Seok, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 281 days.

(21) Appl. No.: 17/090,011

(22) Filed: Nov. 5, 2020

(65) Prior Publication Data

US 2021/0140656 A1 May 13, 2021

(30) Foreign Application Priority Data

Nov. 8, 2019 (KR) .................. 10-2019-0142846

(51) Int. Cl.
*F24F 6/02* (2006.01)
*C02F 1/00* (2006.01)
(Continued)

(52) U.S. Cl.
CPC .............. *F24F 6/02* (2013.01); *C02F 1/001* (2013.01); *C02F 1/325* (2013.01); *C02F 1/467* (2013.01);
(Continued)

(58) Field of Classification Search
CPC ...... C02F 1/001; C02F 1/325; C02F 1/46104; C02F 1/467; C02F 2301/046;
(Continued)

(56) References Cited

U.S. PATENT DOCUMENTS 3,773,307 A * 11/1973 Karlsson .................. B01J 4/001
261/97
4,129,140 A * 12/1978 Carlin ........................ F24F 6/04
417/40
(Continued)

FOREIGN PATENT DOCUMENTS

JP 2008-75951 A 4/2008
JP 2008-241109 A 10/2008
(Continued)

OTHER PUBLICATIONS

International Search Report dated Feb. 3, 2021, in corresponding International Patent Application No. PCT/KR2020/015509.
(Continued)

*Primary Examiner* — Charles S Bushey
(74) *Attorney, Agent, or Firm* — Staas & Halsey LLP

(57) ABSTRACT

A humidifier includes a storage water tank configured to accommodate a predetermined amount of water; a circulation water tank having a smaller capacity than the storage water tank and including a circulation low water level sensor; a supply pump configured to supply water from the storage water tank to the circulation water tank; a circulation pump configured to supply water from the circulation water tank to a humidifying member; a residual water tank configured to accommodate water discharged from the circulation water tank; a drainage member disposed between the circulation water tank and the residual water tank selectively to discharge water from the circulation water tank to the residual water tank and a processor configured to control the drainage member to discharge water from the circulation water tank to the residual water tank when a low water level signal is received from the circulation low water level sensor.

20 Claims, 14 Drawing Sheets

(51) Int. Cl.
*C02F 1/32* (2006.01)
*C02F 1/461* (2006.01)
*C02F 1/467* (2006.01)
*F24F 6/00* (2006.01)

(52) U.S. Cl.
CPC .... *C02F 1/46104* (2013.01); *C02F 2301/046* (2013.01); *C02F 2303/04* (2013.01); *F24F 2006/006* (2013.01); *F24F 2006/008* (2013.01)

(58) Field of Classification Search
CPC ... C02F 2303/04; F24F 6/02; F24F 2006/006; F24F 2006/008
USPC .................................................. 261/DIG. 46
See application file for complete search history.

(56) References Cited

U.S. PATENT DOCUMENTS

| | | | | |
|---|---|---|---|---|
| 4,361,522 A | * | 11/1982 | Goettl | F28G 9/00 261/36.1 |
| 5,718,847 A | * | 2/1998 | Koble, Jr. | G05D 9/12 137/142 |
| 9,429,333 B2 | | 8/2016 | Yoon et al. | |
| 10,228,150 B2 | | 3/2019 | Lee et al. | |
| 2004/0012101 A1 | * | 1/2004 | Wright | F28D 5/00 261/36.1 |
| 2016/0348929 A1 | | 12/2016 | Lee et al. | |
| 2021/0190341 A1 | * | 6/2021 | Lee | F24F 13/28 |

FOREIGN PATENT DOCUMENTS

| | | |
|---|---|---|
| JP | 2010-196971 | 9/2010 |
| JP | 2015-75248 A | 4/2015 |
| JP | 2021-63596 | 4/2021 |
| KR | 10-2009-0048240 | 5/2009 |
| KR | 10-1102006 B1 | 1/2012 |
| KR | 10-1200085 B1 | 11/2012 |
| KR | 10-1403960 B1 | 6/2014 |
| KR | 10-2016-0140328 | 12/2016 |
| KR | 10-1749061 B1 | 6/2017 |
| KR | 10-1893017 B1 | 8/2018 |
| KR | 10-1947157 B1 | 2/2019 |
| KR | 10-2019-0046025 A | 5/2019 |

OTHER PUBLICATIONS

Written Opinion of the International Searching Authority dated Feb. 3, 2021, in corresponding International Patent Application No. PCT/KR2020/015509.

* cited by examiner

HUMIDIFIER

CROSS-REFERENCE TO RELATED APPLICATION

This application is based on and claims priority under 35 U.S.C. § 119 to Korean Patent Application No. 10-2019-0142846, filed on Nov. 8, 2019, in the Korean Intellectual Property Office, the disclosure of which is incorporated by reference herein in its entirety.

BACKGROUND

1. Field

The disclosure relates to a humidifier.

2. Description of the Related Art

A humidifier is a device for increasing or maintaining indoor humidity, and uses electricity to make water particles or make water vapor and discharge it to the outside.

Types of humidifiers include a heating type that boils water with electricity and discharges steam, an ultrasonic type that vibrates water with ultrasonic waves to create water droplets and discharges the water droplets, a combined type of heating type and ultrasonic type, a vaporization type in which water is evaporated naturally by blowing wind through a fan to a humidifying member wet with water, and the like.

Recently, as there have been death incidents due to a humidifier disinfectant used to suppress bacterial growth in humidifiers, interest in the hygiene of humidifiers is increasing.

Even when the humidifier is not in use, water is always contained in the humidifier, and the water stored in the humidifier is continuously circulated, so that microorganisms multiply and the water may become contaminated, scales may form inside the humidifier, or odor may occur.

To prevent this, the humidifier needs to be cleaned frequently. However, frequent cleaning of the humidifier has a problem that the user feels inconvenience and does not perform well. Accordingly, development of a humidifier capable of lengthening the cleaning interval by suppressing contamination inside the humidifier is required.

SUMMARY

The disclosure has been developed in order to overcome the above drawbacks and other problems associated with the conventional arrangement. An aspect of the disclosure relates to a humidifier capable of increasing cleaning interval by suppressing contamination of the humidifier.

According to an aspect of the disclosure, a humidifier may include a storage water tank configured to accommodate a predetermined amount of water; a circulation water tank having a smaller capacity than the storage water tank and including a circulation low water level sensor; a supply pump configured to supply water from the storage water tank to the circulation water tank; a circulation pump configured to supply water from the circulation water tank to a humidifying member; a residual water tank configured to accommodate water discharged from the circulation water tank; a drainage member disposed between the circulation water tank and the residual water tank, the drainage member configured selectively to discharge water from the circulation water tank to the residual water tank; and a processor configured to control the drainage member to discharge water from the circulation water tank to the residual water tank when a low water level signal is received from the circulation low water level sensor of the circulation water tank.

The drainage member may include a drain pump, and an inlet of the drain pump may be connected to a lower portion or an upper portion of the circulation water tank.

The humidifier may include a water filter disposed in a supply pipe connecting the storage water tank and the circulation water tank.

The humidifier may include a sterilization device disposed in the circulation water tank and configured to sterilize water contained in the circulation water tank.

The circulation water tank may include a circulation high water level sensor, and when a high water level signal is output from the circulation high water level sensor, the processor may control the circulation pump to supply water to the humidifying element.

The processor may be configured to shut off an operation of the drainage member and to operate the supply pump to supply water from the storage water tank to the circulation water tank when the water in the circulation water tank is completely discharged.

BRIEF DESCRIPTION OF THE DRAWINGS

These and/or other aspects and advantages of the disclosure will become apparent and more readily appreciated from the following description of the embodiments, taken in conjunction with the accompanying drawings of which.

DETAILED DESCRIPTION OF THE EMBODIMENTS

Hereinafter, embodiments of a humidifier according to the present disclosure will be described in detail with reference to the accompanying drawings.

Various embodiments of the disclosure will hereinafter be described with reference to the accompanying drawings. However, it is to be understood that technologies mentioned in the disclosure are not limited to specific embodiments, but include various modifications, equivalents, and/or alternatives according to embodiments of the disclosure. The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

The terms 'first', 'second', etc. may be used to describe diverse components, but the components are not limited by the terms. The terms may only be used to distinguish one component from the others. For example, without departing from the scope of the present disclosure, a first component may be referred to as a second component, and similarly, a second component may also be referred to as a first component.

The terms used in embodiments of the present disclosure may be construed as commonly known to those skilled in the art unless otherwise defined.

Further, the terms 'leading end', 'rear end', 'upper side', 'lower side', 'top end', 'bottom end', etc. used in the present disclosure are defined with reference to the drawings. However, the shape and position of each component are not limited by the terms.

Figure 1:
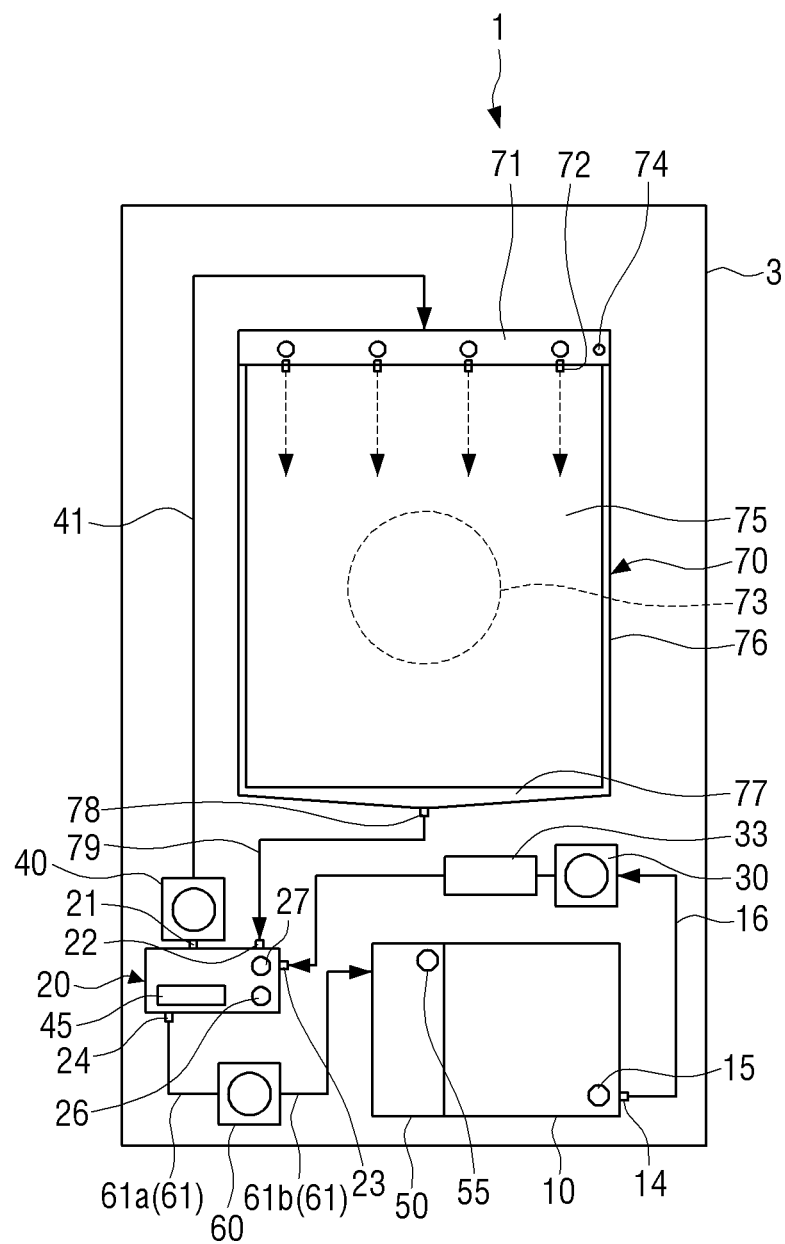
FIG. 1 is a view conceptually illustrating a humidifier according to an embodiment.
Figure 2:
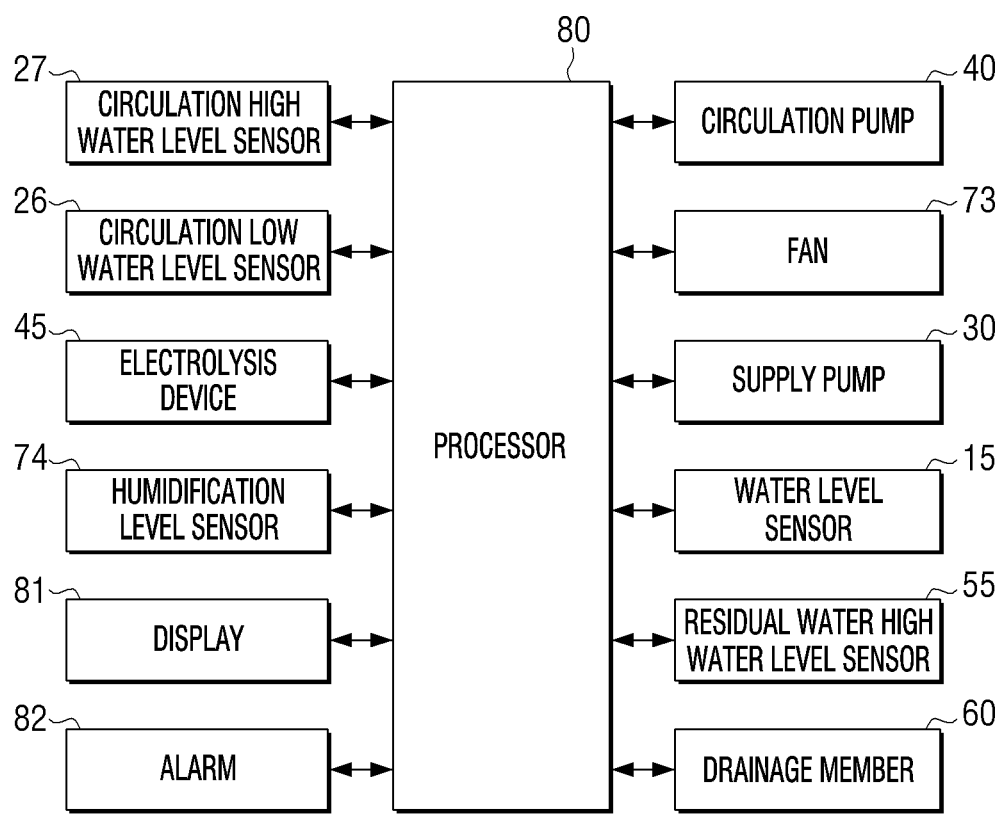
FIG. 2 is a functional block diagram of a humidifier according to an embodiment.

FIG. 1 is a view conceptually illustrating a humidifier according to an embodiment. FIG. 2 is a functional block diagram of a humidifier according to an embodiment.

Referring to FIGS. 1 and 2, a humidifier 1 according to an embodiment of the disclosure may include a housing 3, a storage water tank 10, a circulation water tank 20, a supply pump 30, a circulation pump 40, a residual water tank 50, a drainage member 60, a humidifying member 70, and a processor 80.

The housing 3 forms the appearance of the humidifier 1, and may accommodate the storage water tank 10, the circulation water tank 20, the supply pump 30, the circulation pump 40, the residual water tank 50, the drainage member 60, the humidifying member 70, and the processor 80 therein.

The storage water tank 10 may be formed to accommodate a predetermined amount of water. A supply pipe 16 capable of supplying water to the circulation water tank 20 may be connected to the storage water tank 10. The supply pipe 16 may be connected to the lower portion of the storage water tank 10.

A supply port 14 may be provided in the lower portion of the storage water tank 10 so that the supply pipe 16 is connected thereto. For example, the supply port 14 may be disposed at a height of about 1/10 of the height of the storage water tank 10 from the bottom of the storage water tank 10.

When the supply port 14 is disposed in this way, approximately 90% of the water stored in the storage water tank 10 may be used.

The storage water tank 10 may be formed to be completely sealed. In this case, the storage water tank 10 may include a lid capable of opening and closing the upper portion of the storage water tank 10. Alternatively, the storage water tank 10 may be formed with an open top.

A water level sensor 15 may be disposed in the storage water tank 10. Various types of water level sensors 15 may be disposed in the storage water tank 10. For example, a water level sensor capable of continuously detecting the level of water remaining in the storage water tank 10 may be disposed in the storage water tank 10.

The water level sensor 15 may be configured to detect the level of water contained in the storage water tank 10 in real time and output a water level signal to the processor 80. A water level sensor according to the prior art may be used as the water level sensor 15, so a detailed description thereof is omitted.

As another example, as the water level sensor 15, the storage water tank 10 may be provided with a storage low water level sensor capable of detecting that the water contained in the storage water tank 10 reaches the low water level. The storage low water level sensor may be configured to output a low water level signal to the processor 80 when the water level of the water stored in the storage water tank 10 reaches the reference low water level.

When a low water level signal is input from the storage low water level sensor, the processor 80 may stop the operation of the humidifier 1 and output a water tank supplement alarm through a display 81 or an alarm 82.

Figure 3A:
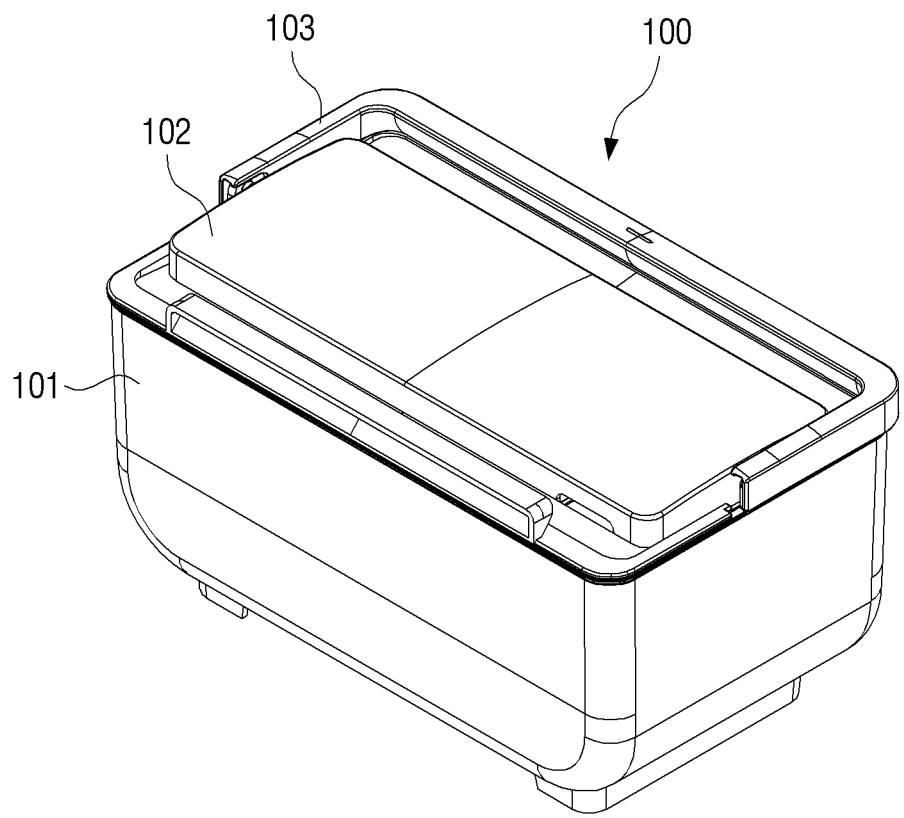
FIG. 3A is a perspective view illustrating a storage water tank of a humidifier according to an embodiment.
Figure 3B:
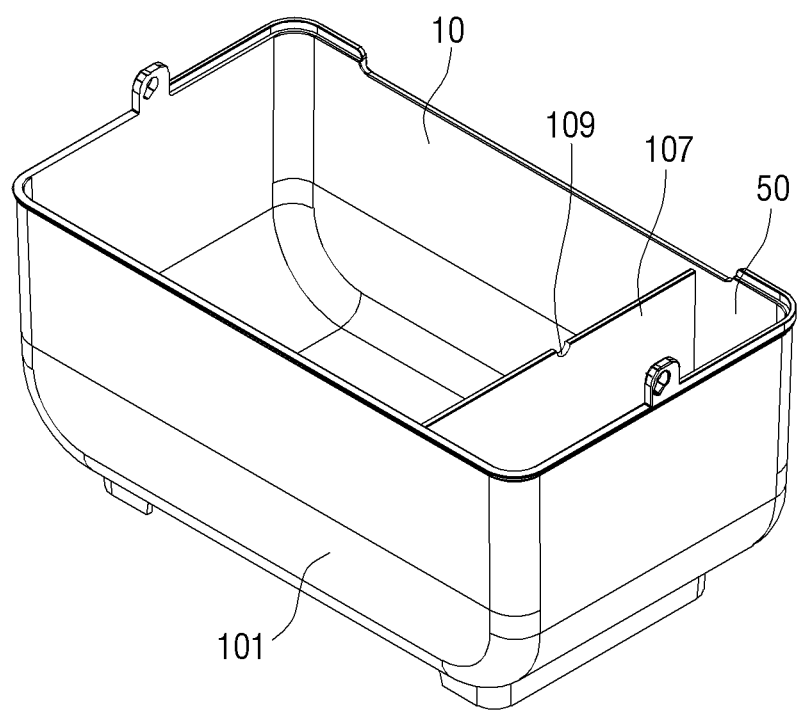
FIG. 3B is a perspective view illustrating a state in which a lid is removed from the storage water tank of FIG. 3A.

As illustrated in FIGS. 3A and 3B, the storage water tank 10 may be integrally formed with the residual water tank 50.

FIG. 3A is a perspective view illustrating a storage water tank of a humidifier according to an embodiment, and FIG. 3B is a perspective view illustrating only a water tank body after removing a lid from the storage water tank of FIG. 3A.

Referring to FIGS. 3A and 3B, a water tank 100 may include a water tank body 101 and a lid 102. The water tank body 101 may be formed as a container having a substantially rectangular parallelepiped shape, and may be divided into the storage water tank 10 and the residual water tank 50 by a partition wall 107. In other words, the storage water tank 10 and the residual water tank 50 may be formed in a single body to form the water tank 100.

The residual water tank 50 may be formed smaller than the storage water tank 10. For example, the residual water tank 50 may be formed to have a capacity of 10% to 30% of the capacity of the storage water tank 10.

The partition wall 107 may block the water collected in the residual water tank 50 from moving to the storage water tank 10.

The lid 102 may be disposed on the top of the water tank body 101 so as to cover the water tank body 101. When the lid 102 is disposed on the open top of the water tank body 101, the water tank body 101 is sealed so that the water in the water tank body 101 does not flow out. In addition, when the lid 102 is disposed on the water tank body 101, the residual water tank 50 and the storage water tank 10 are sealed, so that the water in the residual water tank 50 does not move to the storage water tank 10.

A handle 103 may be provided in the water tank 100 for carrying the water tank 100. The handle 103 may be rotatably disposed at both ends of the top of the water tank body 101. In other words, both ends of the handle 103 may be rotatably disposed at both ends of the top of the water tank body 101.

Figure 4A:
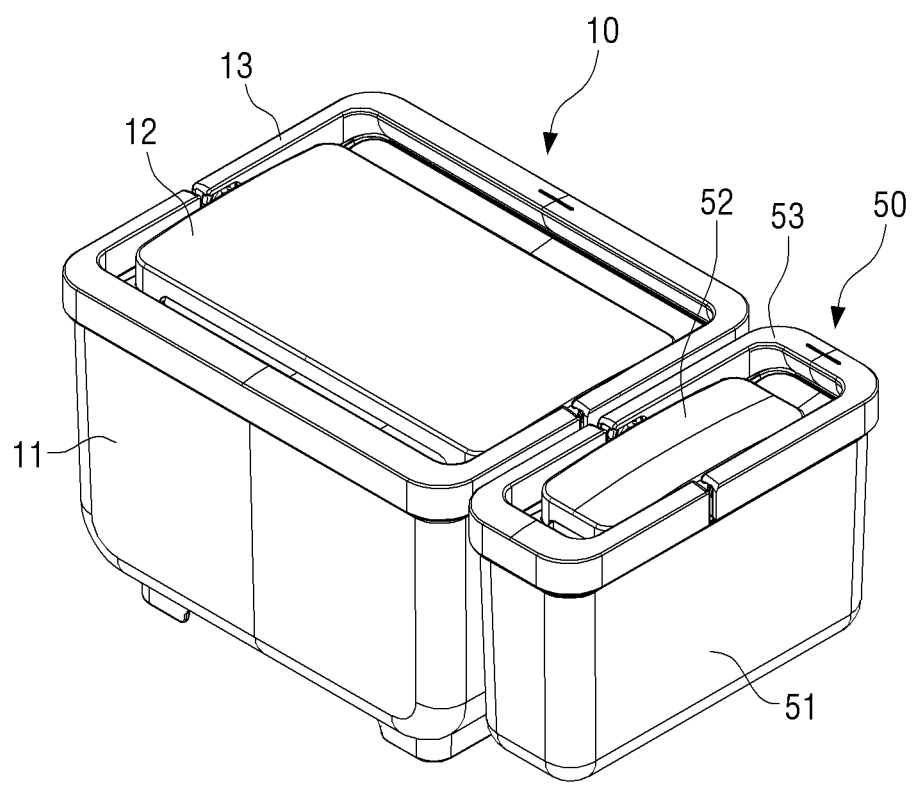
FIG. 4A is a perspective view illustrating another example of a storage water tank of a humidifier according to an embodiment.
Figure 4B:
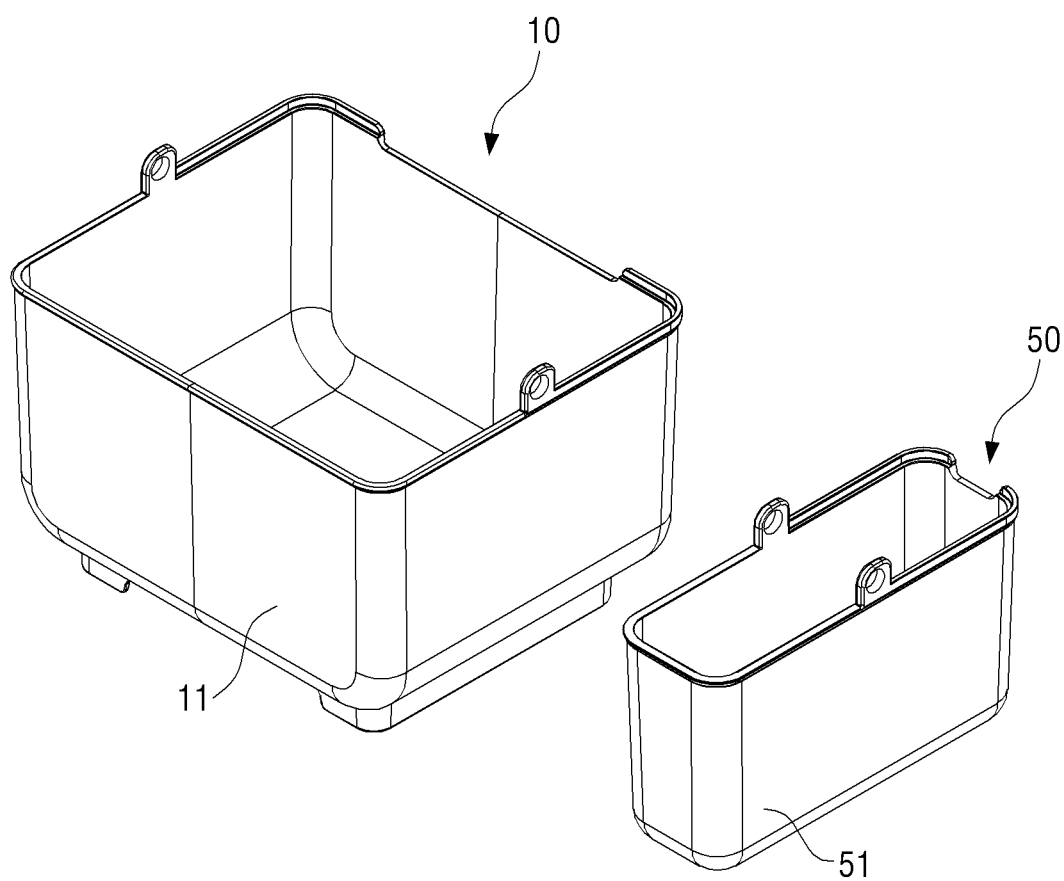
FIG. 4B is a perspective view illustrating a state in which a lid is removed from the storage water tank of FIG. 4A.

As another example, as illustrated in FIGS. 4A and 4B, the storage water tank 10 may be formed separately from the residual water tank 50.

FIG. 4A is a perspective view illustrating another example of a storage water tank of a humidifier according to an embodiment, and FIG. 4B is a perspective view illustrating a state in which a lid is removed from the storage water tank of FIG. 4A.

Referring to FIGS. 4A and 4B, the storage water tank 10 may include a storage water tank body 11 and a storage lid 12.

The storage water tank body 11 may be formed in a container having a substantially rectangular parallelepiped shape. The storage lid 12 may be formed to cover the open top of the storage water tank body 11. When the storage lid 12 is coupled to the open top of the storage water tank body 11, the storage water tank body 11 is sealed so that the water in the storage water tank body 11 does not leak to the outside.

The storage water tank 10 may be provided with a handle 13 for carrying the storage water tank 10. The handle 13 may be rotatably disposed at both ends of the top of the storage water tank body 11. In other words, both ends of the handle 13 may be rotatably disposed at both ends of the top of the storage water tank body 11.

The residual water tank 50 may be formed separately from the storage water tank 10 and may include a residual water tank body 51 and a residual water lid 52.

The residual water tank body 51 may be formed in a container having a substantially rectangular parallelepiped shape. The residual water lid 52 may be formed to cover the open top of the residual water tank body 51. When the residual water lid 52 is coupled to the open top of the residual water tank body 51, the residual water tank body 51 is sealed so that the water collected in the residual water tank body 51 does not leak to the outside.

The residual water tank body 51 may be formed smaller than the storage water tank body 11. For example, the residual water tank body 51 may be formed to have a capacity of 10% to 30% of the capacity of the storage water tank body 11.

A handle 53 may be provided in the residual water tank 50 for carrying the residual water tank 50. The handle 53 may be rotatably disposed at both ends of the top of the residual water tank body 51. In other words, both ends of the handle 53 may be rotatably disposed at both ends of the top of the residual water tank body 51.

The circulation water tank 20 may be connected to the storage water tank 10 and may be provided to receive water from the storage water tank 10. The circulation water tank 20 may be connected to the storage water tank 10 through the supply pipe 16.

The supply pump 30 may be provided in the supply pipe 16 to supply water from the storage water tank 10 to the circulation water tank 20. The supply pump 30 may be provided in the supply pipe 16 to suck water from the storage water tank 10 and discharge the water to the circulation water tank 20. Accordingly, when the supply pump 30 operates, the water in the storage water tank 10 is supplied to the circulation water tank 20 through the supply pipe 16 and the supply pump 30.

In addition, a water filter 33 may be provided in the supply pipe 16. The water filter 33 may be disposed between the supply pump 30 and the circulation water tank 20. A filter mounting part 35 may be provided in the supply pipe 16. The water filter 33 may be detachably disposed on the filter mounting part 35.

The water filter 33 may be configured to filter water supplied from the supply pump 30 and supply the filtered water to the circulation water tank 20. The water filter 33 may be configured to remove sludge, bacteria, etc. in water. For example, the water filter 33 may be formed of an ultra-filtration membrane filter. Alternatively, as another example, a filter formed by sequentially connecting an ultra-filtration membrane filter, a sediment filter, and an activated carbon filter may be used as the water filter 33.

Figure 5:
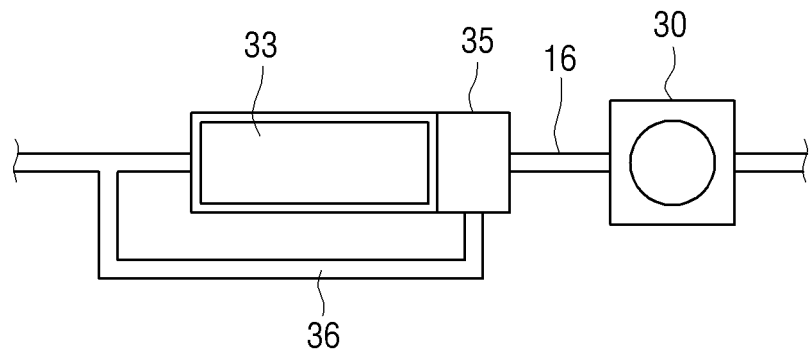
FIG. 5 is a partial view illustrating a water filter and a bypass pipe provided in a supply pipe of a humidifier according to an embodiment.

As another example, as illustrated in FIG. 5, a bypass pipe 36 may be provided on one side of the filter mounting part 35. The bypass pipe 36 may be formed to allow water supplied from the supply pump 30 to pass through the bypass pipe 36 when the water filter 33 is not mounted on the filter mounting part 35.

Accordingly, the filter mounting part 35 may be formed so that when the water filter 33 is mounted in the filter mounting part 35, water supplied from the supply pump 30 passes through the water filter 33 and when the water filter 33 is not mounted, water supplied from the supply pump 30 flows through the bypass pipe 36. Here, FIG. 5 is a partial view illustrating a water filter and a bypass pipe provided in a supply pipe of a humidifier according to an embodiment.

The circulation water tank 20 may be formed to receive a predetermined amount of water from the storage water tank 10 and supply it to the humidifying member 70, and to recover water discharged from the humidifying member 70. In addition, the circulation water tank 20 may be connected to the residual water tank 50 and may be formed to discharge water contained in the circulation water tank 20 to the residual water tank 50. Accordingly, the circulation water tank 20 may be formed to have a smaller capacity than the storage water tank 10. For example, the capacity of the circulation water tank 20 may be set to 10% to 30% of the capacity of the storage water tank 10.

The circulation water tank 20 may be formed in a sealed form, and may include a humidifying port 21 configured to supply water to the humidifying member 70, a recovery port 22 through which water discharged from the humidifying member 70 is introduced, an inlet port 23 through which water supplied from the storage water tank 10 is introduced and a drain port 24 configured to discharge water to the residual water tank 50. In addition, although not illustrated, the circulation water tank 20 may have an opening at an upper or lower portion to allow internal cleaning. A removable lid may be disposed at the opening.

The circulation pump 40 for supplying water to the humidifying member 70 is disposed in the humidifying port 21. Therefore, when the circulation pump 40 is operated, water in the circulation water tank 20 may be supplied to the humidifying member 70. One end of the supply pipe 16 is connected to the inlet port 23. Accordingly, when the supply pump 30 is operated, the water in the storage water tank 10 may be supplied to the circulation water tank 20 through the supply pipe 16.

The circulation water tank 20 may include a circulation low water level sensor 26 so that when a predetermined amount of water accommodated in the circulation water tank 20 is consumed, water is supplied from the storage water tank 10. The circulation low water level sensor 26 may be formed to output a low water level signal to the processor 80 when the water level in the circulation water tank 20 reaches the reference low water level.

When a low water level signal is output from the circulation low water level sensor 26 disposed in the circulation water tank 20, the processor 80 may control the drainage member 60 and the supply pump 30 so that the drainage member 60 drains the water remaining in the circulation water tank 20 to the residual water tank 50 and the supply pump 30 supplies a predetermined amount of water from the storage water tank 10 to the circulation water tank 20.

The circulation low water level sensor 26 may be configured to output a low water level signal when the water in the circulation water tank 20 remains 5% to 25% of the capacity of the circulation water tank 20. The low water level at which the circulation low water level sensor 26 outputs the low water level signal may vary depending on a state of the water and humidification operation conditions.

As the water remaining in the circulation water tank 20 decreases, the hardness of the water remaining in the circulation water tank 20 increases.

In general, the hardness of water accommodated in a water container that accommodates water circulating through the humidifying member 70, such as the circulation water tank 20, increases rapidly as the amount of water remaining in the water container (i.e., residual water amount) decreases. This will be described with reference to FIG. 12.

Figure 12:
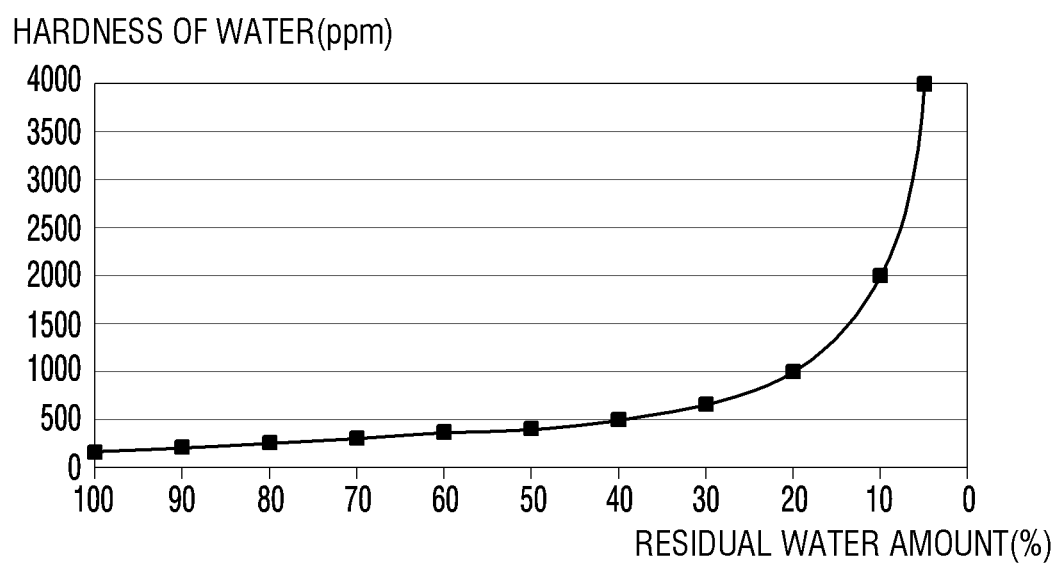
FIG. 12 is a graph illustrating a change in hardness of water depending on an amount of water remaining in a circulation water tank in a humidifier according to an embodiment and the humidifier according to the prior art.

FIG. 12 is a graph illustrating a change in hardness of water depending on an amount of water remaining in a circulation water tank in a humidifier according to an embodiment and the humidifier according to the prior art. In FIG. 12, the horizontal axis represents the residual water amount (%), and the vertical axis represents hardness of water (ppm). The residual water amount (%) represents the ratio of the amount of water remaining in a water container to the storage capacity of the water container. Therefore, when the water container is full, the residual water amount is 100%, and when the water container is empty, the residual water amount is 0%.

Referring to FIG. 12, the hardness of water gradually increases until the residual water amount reaches about 30%, but when the residual water amount reaches 30% or less, the hardness of water increases exponentially. Therefore, the hardness of water as the residual water amount decreases may form an exponential curve.

When the hardness of water in the circulation water tank 20 is high, contamination of the humidifying member 70, the circulation water tank 20, and internal pipes 41 and 79 is accelerated. Therefore, when the residual water amount becomes less than a predetermined level, the water in the circulation water tank 20 may be drained to the residual water tank 50. Accordingly, the circulation low water level sensor 26 may be disposed in the circulation water tank 20 to detect that the residual water amount of the circulation water tank 20 reaches a set value in the range of 5% to 25% and output a low water level signal.

In this case, the low water level at which the circulation low water level sensor 26 outputs the low water level signal may be set to such an extent that the water remaining in the circulation water tank 20 does not contaminate the humidifying member 70, the circulation water tank 20, and the internal pipes 41 and 79. For example, when the hardness of water remaining in the circulation water tank 20 is to be managed to be less than 1000 ppm, the circulation low water level sensor 26 may be disposed to detect when the residual water amount becomes 25% and output a low water level signal.

As another example, when the hardness of water remaining in the circulation water tank 20 is to be managed at 4000 ppm, the circulation low water level sensor 26 may be disposed to detect when the residual water amount becomes 5% and output a low water level signal.

The circulation water tank 20 may include a circulation high water level sensor 27 to limit the amount of water supplied from the storage water tank 10. The circulation high water level sensor 27 may be formed to output a high water level signal to the processor 80 when the water level in the circulation water tank 20 reaches the reference high water level.

When a high water level signal is output from the circulation high water level sensor 27, the processor 80 stops the supply pump 30 to block water from being supplied from the storage water tank 10 to the circulation water tank 20. In addition, when the high water level signal is output from the circulation high water level sensor 27, the processor 80 may recognize that the circulation water tank 20 is full. Therefore, if necessary, the processor 80 may supply water to the humidifying member 70 by operating the circulation pump 40.

A sterilization device capable of sterilizing the water contained in the circulation water tank 20 may be disposed in the circulation water tank 20. The sterilization device may be formed to prevent contamination of the water in the circulation water tank 20 by removing bacteria in the water. For example, the sterilization device may include an electrolysis device 45.

The electrolysis device 45 may be formed to remove bacteria in the water by electrolyzing water contained in the circulation water tank 20. When the electrolysis device 45 is disposed in the circulation water tank 20 in this way, the concentration of microorganisms that naturally grow in the circulation water tank 20 may be minimized.

The processor 80 may determine whether the water contained in the circulation water tank 20 is contaminated or not by using the electrolysis device 45. For example, the processor 80 may monitor a current generated when water is electrolyzed by the electrolysis device 45, and may determine that the water is contaminated when the current is more than a reference value. When it is determined that the water is contaminated, the processor 80 may stop the operation of the humidifier 1 and output a water contamination alarm through the display 81 or the alarm 82.

However, when the current generated by the electrolysis device 45 during electrolysis is less than the reference value, the processor 80 may determine that water is not contaminated and maintain the operation of the humidifier 1. Through this method, the processor 80 may prevent the use of contaminated water in the humidifier 1.

Figure 6:
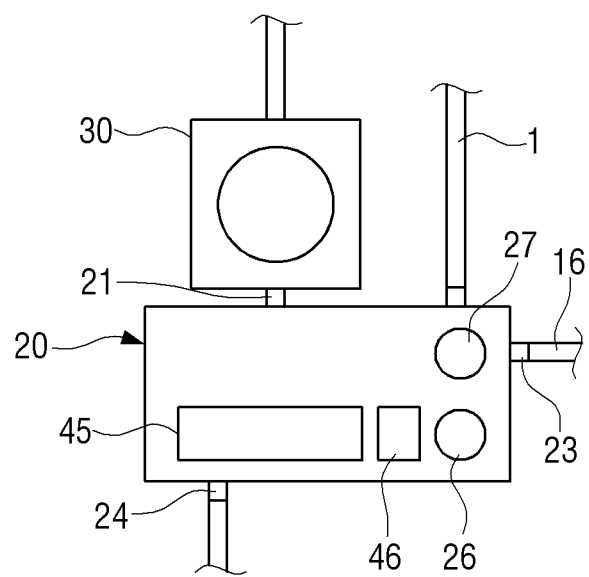
FIG. 6 is a view illustrating a case where an electrolysis device and an ultraviolet lamp are disposed in a circulation water tank of a humidifier according to an embodiment.

As another example, as illustrated in FIG. 6, the sterilization device disposed in the circulation water tank 20 may include the electrolysis device 45 and an ultraviolet lamp 46 or an ultraviolet filter. When the ultraviolet lamp 46 or the ultraviolet filter is additionally disposed in the circulation water tank 20 as described above, the sterilization power of the sterilization device disposed in the circulation water tank 20 may be improved. Here, FIG. 6 is a view illustrating a case where an electrolysis device 45 and an ultraviolet lamp 46 are disposed in a circulation water tank of a humidifier according to an embodiment.

As another example, the humidifier 1 according to an embodiment of the disclosure may further include a sub-sterilization device 48. The sub-sterilization device 48 may be disposed to further improve the sterilization ability of the humidifier 1.

Figure 7:
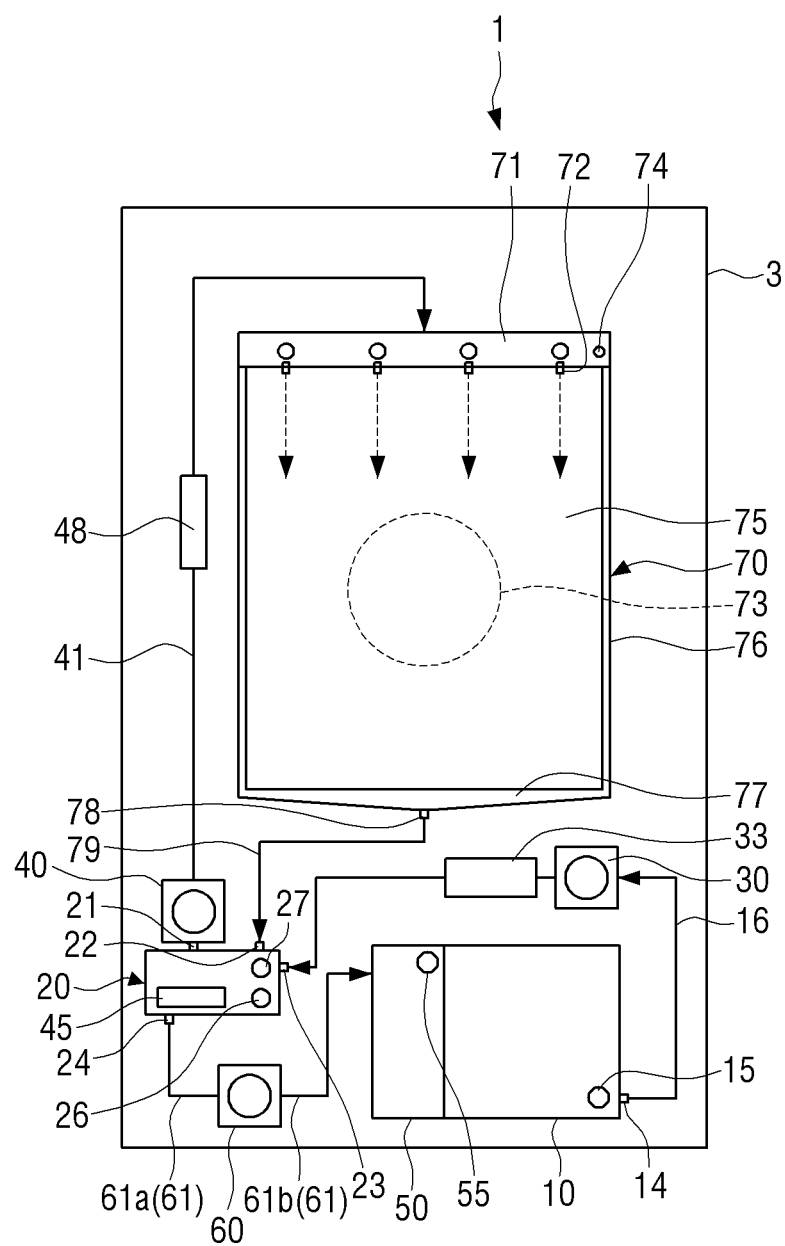
FIG. 7 is a view illustrating a case where a sub-sterilizing device is disposed between a circulation pump and a humidifying member of a humidifier according to an embodiment.

The sub-sterilization device 48 may be disposed to sterilize the water being supplied from the circulation water tank 20 to the humidifying member 70. For example, the sub-sterilization device 48 may be disposed between the circulation pump 40 of the circulation water tank 20 and the humidifying member 70 as illustrated in FIG. 7. Here, FIG. 7 is a view illustrating a case where a sub-sterilization device is disposed between a circulation pump and a humidifying member of a humidifier according to an embodiment.

The circulation pump 40 and the humidifying member 70 may be connected to each other through a humidifying pipe 41, and the sub-sterilization device 48 may be disposed in the humidifying pipe 41. When the sub-sterilization device 48 is disposed in the humidifying pipe 41 in this way, the sub-sterilization device 48 secondly sterilizes the water being supplied to the humidifying member 70, and then supplies the water to the humidifying member 70. Therefore, it is possible to prevent or reduce the humidifying member 70 from being contaminated by microorganisms or the like. As the sub-sterilization device 48, an ultraviolet lamp, an ultraviolet filter, or the like may be used.

The circulation pump 40 may be provided in the humidifying pipe 41 to suck water from the circulation water tank 20 and supply it to the humidifying member 70. For example, an inlet of the circulation pump 40 may be connected to the humidifying port 21 of the circulation water tank 20, and an outlet of the circulation pump 40 may be connected to the humidifying pipe 41. Therefore, when the circulation pump 40 operates, the water in the circulation water tank 20 may be supplied to the humidifying member 70 through the humidifying pipe 41.

The residual water tank 50 may be formed to accommodate the water discharged from the circulation water tank 20. The residual water tank 50 may be connected to the circulation water tank 20 through a drain pipe 61. The drain port 24 of the circulation water tank 20 may be connected to one end of the drain pipe 61.

The residual water tank 50 may be formed integrally with the storage water tank 10 or may be formed separately from the storage water tank 10. For example, as illustrated in FIGS. 3A and 3B, the storage water tank 10 and the residual water tank 50 may be formed by partitioning the water tank body 101 by the partition wall 107.

As another example, as illustrated in FIGS. 4A and 4B, the residual water tank 50 may be formed separately from the storage water tank 10. In detail, the residual water tank 50 may include a residual water tank body 51 and a residual water lid 52.

The residual water tank body 51 may be formed in a container having a substantially rectangular parallelepiped shape, and the residual water lid 52 may be formed to cover the open top of the residual water tank body 51. When the residual water lid 52 is coupled to the open top of the residual water tank body 51, the residual water tank body 51 is sealed so that water in the residual water tank body 51 does not flow out. The residual water tank body 51 may be formed to have a capacity of 10% to 30% of the capacity of the storage water tank body 11.

A residual water high water level sensor 55 may be disposed in the residual water tank 50. The residual water high water level sensor 55 may be formed to output a high water level signal when the level of water collected in the residual water tank 50 reaches a reference high water level.

When a high water level signal is output from the residual water high water level sensor 55, the processor 80 may stop the operation of the humidifier 1 and output a residual water tank emptying alarm to the outside. In this case, the processor 80 controls the display 81 or the alarm 82 to output the residual water tank emptying alarm. Thus, the user may separate the residual water tank 50 form the humidifier 1 and discard the water in the residual water tank 50, and then mount the empty residual water tank 50 back on the humidifier 1.

On the other hand, the processor 80 may continue to operate the drainage member 60 so that all the water in the circulation water tank 20 is discharged to the residual water tank 50 before completely stopping the operation of the humidifier 1. In this case, the residual water tank 50 may overflow.

In order to prevent this, as illustrated in FIG. 3B, when the residual water tank 50 is formed integrally with the storage water tank 10, an overflow prevention part 109 may be formed at the top end of the partition wall 107 provided between the residual water tank 50 and the storage water tank 10. In a state in which the residual water high water level sensor 55 is operated, when the water in the residual water tank 50 exceeds the full water level, the water in the residual water tank 50 may be discharged to the storage water tank 10 through the overflow prevention part 109.

In this case, the overflow prevention part 109 may be formed as a hole or a groove in the top end of the partition wall 107. In addition, the full water level of the residual water tank 50 may be set to a level slightly higher than the high water level at which the residual water high water level sensor 55 operates. Therefore, when the water in the residual water tank 50 exceeds the full water level, the water in the residual water tank 50 is discharged to the storage water tank 10 through the overflow prevention part 109, so that the water in the residual water tank 50 does not overflow to the outside.

In addition, because the residual water tank 50 is formed integrally with the storage water tank 10, when the user empties the residual water tank 50, the water in the storage water tank 10 is also discarded. Therefore, it does not happen that the humidifier 1 uses the water in the storage water tank 10 contaminated with the water in the residual water tank 50 to perform humidification.

On the other hand, the drainage member 60 may be disposed between the circulation water tank 20 and the residual water tank 50 so that the water in the circulation water tank 20 may be selectively discharged to the residual water tank 50. The drainage member 60 may be disposed in the drain pipe 61. A drain pump 60a or a drain valve 60b may be used as the drainage member 60.

Hereinafter, the type and arrangement of the drainage member 60 will be described in detail with reference to FIGS. 8, 9, and 10.

Figure 8:
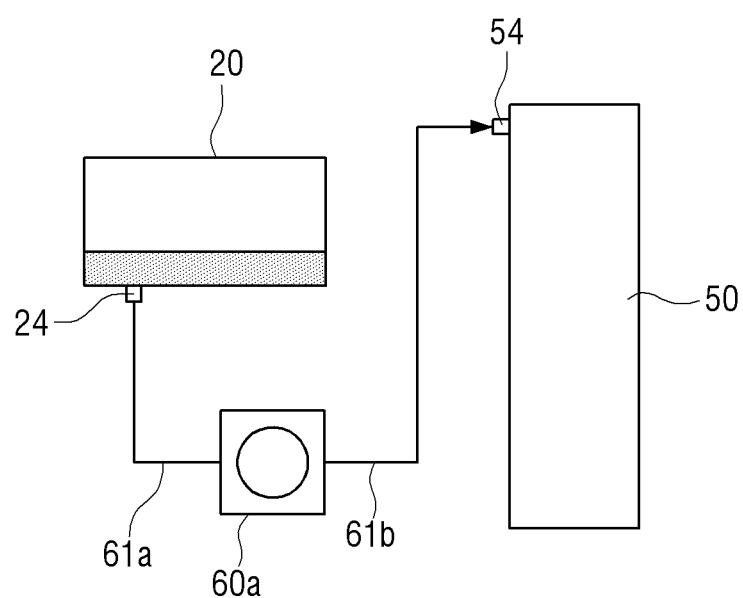
FIG. 8 is a view illustrating an example of a drainage member of a humidifier according to an embodiment.

FIG. 8 is a view illustrating an example of a drainage member of a humidifier according to an embodiment.

Referring to FIG. 8, the drainage member 60 is disposed in the drain pipe 61 connecting the circulation water tank 20 and the residual water tank 50, and the drain pump 60a is used as the drainage member 60.

One end of the drain pump 60a is connected to the bottom surface of the circulation water tank 20. In other words, the drain port 24 of the circulation water tank 20 is provided on the bottom surface of the circulation water tank 20, and a first drain pipe 61a connected to the inlet of the drain pump 60a is disposed at the drain port 24. The outlet of the drain pump 61a is connected to the residual water tank 50 through a second drain pipe 61b. The second drain pipe 61b is connected to the inlet port 54 provided on the upper portion of the residual water tank 50. The first and second drain pipes 61a and 61b form the drain pipe 61.

Accordingly, when the drain pump 60a is operated, the water in the circulation water tank 20 is discharged to the residual water tank 50 through the first and second drain pipes 61a and 61b. However, when the drain pump 60a does not operate, the water in the circulation water tank 20 is not discharged to the residual water tank 50.

Figure 9:
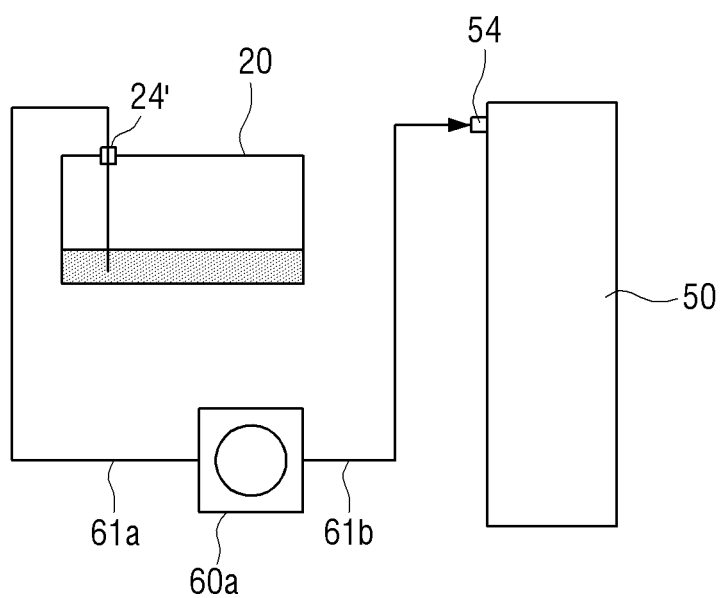
FIG. 9 is a view illustrating another example of a drainage member of a humidifier according to an embodiment.

In FIG. 8, the drain pump 60a is connected to the bottom surface of the circulation water tank 20, but the drain pump 60a may be connected to the upper portion of the circulation water tank 20 as illustrated in FIG. 9.

FIG. 9 is a view illustrating another example of a drainage member of a humidifier according to an embodiment.

Referring to FIG. 9, an inlet of the drain pump 60a is connected to the top surface of the circulation water tank 20. In detail, a drain port 24' is provided on the top surface of the circulation water tank 20, and the first drain pipe 61a connected to the inlet of the drain pump 60a is disposed to be inserted into the drain port 24'. The first drain pipe 61a is disposed so that one end of the first drain pipe 61a is adjacent to the bottom surface of the circulation water tank 20. In other words, the first drain pipe 61a may be disposed so that when the drain pump 60a operates, all of the water accommodated in the circulation water tank 20 is discharged to the residual water tank 50 through the first drain pipe 61a and the drain pump 60a.

The outlet of the drain pump 60a is connected to the residual water tank 50 through the second drain pipe 61b. The second drain pipe 61b is connected to the inlet port 54 provided on the upper portion of the residual water tank 50.

Accordingly, when the drain pump 60a is operated, the water in the circulation water tank 20 is discharged to the residual water tank 50 through the first and second drain pipes 61a and 61b. However, when the drain pump 60a does not operate, the water in the circulation water tank 20 is not discharged to the residual water tank 50.

In FIGS. 8 and 9, the drain pump 60a is used as the drainage member 60. However, as another example, the drain valve 60b may be used as the drainage member 60.

Figure 10:
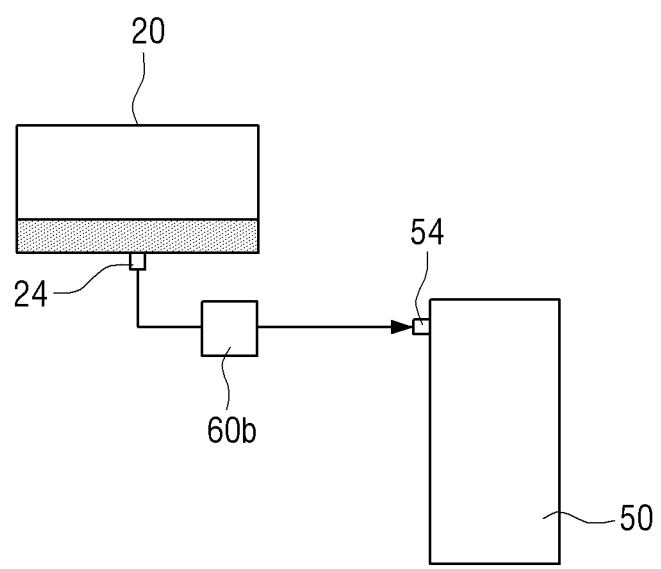
FIG. 10 is a view illustrating another example of a drainage member of a humidifier according to an embodiment.

FIG. 10 is a view illustrating a case in which a drain valve is used as a drainage member of a humidifier according to an embodiment.

Referring to FIG. 10, the drain valve 60b may be disposed in the drain pipe 61 connecting the circulation water tank 20 and the residual water tank 50.

The inlet of the drain valve 60b is connected to the bottom surface of the circulation water tank 20. In other words, the drain port 24 is provided on the bottom surface of the circulation water tank 20, and the first drain pipe 61a connected to the inlet of the drain valve 60b is disposed at the drain port 24. The outlet of the drain valve 60b is connected to the residual water tank 50 through the second drain pipe 61b. The second drain pipe 61b is connected to the inlet port 54 provided on the upper portion of the residual water tank 50.

In this case, the circulation water tank 20 may be disposed on the upper side of the residual water tank 50 so that the water in the circulation water tank 20 is discharged to the residual water tank 50 by gravity. In other words, the circulation water tank 20 may be disposed to be positioned higher than the residual water tank 50. Accordingly, the outlet of the drain valve 60b and the second drain pipe 61b may be disposed to be positioned at the same level as or at a higher level than the inlet port 54 of the residual water tank 50.

In the case where the drain valve 60b is disposed as illustrated in FIG. 10, when the drain valve 60b is opened by the processor 80, the water in the circulation water tank 20 is discharged to the residual water tank 50 through the first and second drain pipes 61a and 61b. When the drain valve 60b is closed, the water in the circulation water tank 20 is not discharged to the residual water tank 50.

The humidifying member 70 may be formed to vaporize the water supplied from the circulation water tank 20. The humidifying member 70 may include a distributor 71, a humidifying element 75, a humidifying element case 76, and a recovery portion 77.

The distributor 71 may be formed to disperse the water supplied from the circulation water tank 20 to the humidifying element 75. The distributor 71 may be formed in a tube shape. A plurality of nozzles 72 are provided on the lower surface of the distributor 71 on which the humidifying element 75 is disposed.

Each of the plurality of nozzles 72 may be formed to have an inner diameter of 0.5 mm to 3 mm. In this case, the plurality of nozzles 72 may be formed so that the sum of the areas of all the nozzles 72 is smaller than the cross-sectional area of the flow path portion of the distributor 71. The distributor 71 may be formed to be sealed except for the plurality of nozzles 72.

The distributor 71 may be formed to receive a predetermined amount of water supplied by the circulation pump 40 and to supply some of the received water to the humidifying element 75 through the plurality of nozzles 72. In this case, the water may be supplied to the humidifying element 75 through the plurality of nozzles 72 by gravity.

Therefore, the plurality of nozzles 72 are always in an open state. The amount of water supplied to the distributor 71 by the circulation pump 40 may be set to be greater than the amount of water discharged from the distributor 71 to the humidifying element 75 through the plurality of nozzles 72.

In this case, a humidification level sensor 74 may be disposed to detect the level of water contained in the distributor 71. The processor 80 may supply water to the distributor 71 or cut off the supply of water by controlling the circulation pump 40 according to a signal output from the humidification level sensor 74.

The humidifying element 75 is a type of filter for vaporizing water, and may be formed of a humidifying fabrics. The humidifying element 75 is disposed under the distributor 71, and water discharged through the plurality of nozzles 72 wets the humidifying element 75.

A fan 73 may be disposed behind the humidifying element 75. Accordingly, when the fan 73 is operated, the wind generated by the fan 73 passes through the humidifying element 75. Then, the water soaked in the humidifying element 75 may be vaporized and discharged to the outside of the humidifier 1.

The humidifying element 75 may be detachably disposed in the humidifying element case 76 provided in the housing 3 of the humidifier 1. Accordingly, the user may replace the humidifying element 75.

The recovery portion 77 may be provided at the lower end of the humidifying element 75. The recovery portion 77 may be formed to collect water that has not been vaporized while passing through the humidifying element 75. A drain hole 78 may be provided at the bottom surface of the recovery portion 77 to discharge the collected water. To this end, the bottom surface of the recovery portion 77 may be formed as an inclined surface inclined toward the drain hole 78. Accordingly, the water collected in the recovery portion 77 may be discharged through the drain hole 78.

Because the recovery portion 77 is connected to the circulation water tank 20, the water collected in the recovery portion 77 may be discharged to the circulation water tank 20 and be reused for humidification. In detail, the drain hole 78 of the recovery portion 77 is connected to the recovery port 22 of the circulation water tank 20 through a recovery pipe 79. Accordingly, the water collected in the recovery portion 77 is discharged to the circulation water tank 20 through the drain hole 78, the recovery pipe 79, and the recovery port 22.

The water collected in the circulation water tank 20 through the recovery port 22 may be mixed with the water contained in the circulation water tank 20. The mixed water in the circulation water tank 20 may be supplied to the humidifying member 70 by the circulation pump 40 again.

The humidifier 1 may include the display 81 and the alarm 82.

The display 81 may be configured to output status information of the humidifier 1 under the control of the processor 80, for example, information such as the water level of the storage water tank 10 or various alarms related to the humidifier 1 as described above. For example, the display 81 may be formed as a liquid crystal panel.

The alarm 82 may be provided to output various alarms as described above by sounds under the control of the processor 80, and may include a speaker, a buzzer, and the like.

The processor 80 may be configured to control the humidifier 1. For example, when the humidifier 1 is turned on, the processor 80 may control the supply pump 30 to supply water from the storage water tank 10 to the circulation water tank 20. When the water supplied to the circulation water tank 20 by the supply pump 30 reaches a predetermined water level, the processor 80 may operate the circulation pump 40 to supply water to the humidifying member 70. Further, the processor 80 may operate the fan 73 so that the wind generated by the fan 73 passes through the humidifying element 75. Then, water in the humidifying element 75 is vaporized and discharged to the outside of the humidifier 1.

The processor 80 may include, for example, a processing circuit such as an electronic circuit board, various electronic components such as ASICs, ROMs, RAMs, and/or program modules. The processor 80 may be disposed in the housing 3 of the humidifier 1 and may be disposed in a control panel (not illustrated) provided to allow the user to control the humidifier 1.

Hereinafter, a method of controlling the above-described components of the humidifier 1 by the processor 80 will be described in detail.

The processor 80 is electrically connected to the water level sensor 15 of the storage water tank 10. Accordingly, the processor 80 may be configured to stop the operation of the humidifier 1 and output a water tank supplement alarm to the outside through the display 81 or the alarm 82 when a low water level signal is input from the water level sensor 15.

The processor 80 is electrically connected to the supply pump 30. Accordingly, the processor 80 may control the supply pump 30 to supply water from the storage water tank 10 to the circulation water tank 20. In detail, when the processor 80 turns on the supply pump 30, the supply pump 30 is operated to supply the water from the storage water tank 10 to the circulation water tank 20 through the supply pipe 16. When the processor 80 turns off the supply pump 30, the operation of the supply pump 30 is stopped, so that the water in the storage water tank 10 is not supplied to the circulation water tank 20.

The processor 80 may determine the replacement timing of the water filter 33 and output a water filter replacement alarm. For example, the processor 80 may determine the time when the flow rate of water supplied to the circulation water tank 20 by the supply pump 30 decreases by 50% to 80% compared to the initial flow rate as the replacement timing of the water filter 33, and then may output the water filter replacement alarm through the display 81 or the alarm 82.

For example, the processor 80 may determine whether the flow rate of water supplied to the circulation water tank 20 through the water filter 33 decreases by detecting the time it takes for the water in the circulation water tank 20 to reach the high water level from the time when the supply pump 30 starts supplying water to the circulation water tank 20.

Because a large amount of water per hour may pass through a new water filter 33, it takes less time for the supply pump 30 to fill the water in the circulation water tank 20. However, when the water filter 33 is used for a long time, because the amount of water that may pass through the water filter 33 per hour decreases, it takes a longer time for the supply pump 30 to fill the water in the circulation water tank 20 compared to the new water filter.

Accordingly, the processor 80 may determine the life of the water filter 33 by detecting the time it takes for the supply pump 30 to fill water in the circulation water tank 20. When the time exceeds the reference time, the processor 80 may determine that the life of the water filter 33 is over, and may output a water filter replacement alarm.

The processor 80 is electrically connected to the circulation high water level sensor 27, the circulation low water level sensor 26, and the circulation pump 40 disposed in the circulation water tank 20.

When the supply pump 30 is operated so that the water supplied from the storage water tank 10 to circulation water tank 20 reaches the high water level, the circulation high water level sensor 27 outputs a high water level signal. When the high water level signal is input from the circulation high water level sensor 27, the processor 80 turns off the supply pump 30 to block the water in the storage water tank 10 from being supplied to the circulation water tank 20.

At the same time, the processor 80 operates the electrolysis device 45 to sterilize the water in the circulation water tank 20. When the sterilization is finished, the processor 80 turns on the circulation pump 40. Then, the circulation pump 40 is operated to supply the water in the circulation water tank 20 to the humidifying member 70.

The processor 80 continuously operates the circulation pump 40 so that the water in the circulation water tank 20 circulates through the humidifying member 70. While the water in the circulation water tank 20 is circulating through the humidifying member 70, the water in the circulation water tank 20 may be reduced by vaporization generated in the humidifying element 75.

When the water in the circulation water tank 20 reaches the low water level, the circulation low water level sensor 26 outputs a low water level signal. When the low water level signal is input from the circulation low water level sensor 26, the processor 80 turns off the circulation pump 40 so that the water in the circulation water tank 20 is not supplied to the humidifying member 70.

Subsequently, the processor 80 controls the drainage member 60 to discharge the water from the circulation water tank 20 to the residual water tank 50.

For example, when the drainage member 60 is the drain pump 60*a*, the processor 80 turns on the drain pump 60*a*. Then, the water remaining in the circulation water tank 20 is discharged to the residual water tank 50 through the drain pipe 61.

When the water in the circulation water tank 20 is completely discharged, the processor 80 turns off the drain pump 60*a* and turns on the supply pump 30. Then, the water in the storage water tank 10 is supplied to the circulation water tank 20 by the supply pump 30.

As another example, when the drainage member 60 is the drain valve 60b, the processor 80 opens the drain valve 60b. Then, the water remaining in the circulation water tank 20 is discharged to the residual water tank 50 through the drain pipe 61 and the drain valve 60b by gravity.

When the water in the circulation water tank 20 is completely discharged, the processor 80 closes the drain valve 60b and turns on the supply pump 30. Then, the water in the storage water tank 10 is supplied to the circulation water tank 20 by the supply pump 30.

As described above, in the humidifier 1 according to an embodiment of the disclosure, the water remaining in the circulation water tank 20 after circulating the humidifying member 70 is not mixed and used with water newly supplied from the storage water tank 10, but discharged to the residual water tank 50. Therefore, contamination of the humidifying member 70 or the circulation water tank 20 due to the residual water may be suppressed.

The processor 80 is electrically connected to the residual water high water level sensor 55 disposed in the residual water tank 50. Accordingly, when a high water level signal is input from the residual water high water level sensor 55, the processor 80 may stop the operation of the humidifier 1, and output a residual water tank emptying alarm to the outside through the display 81 or the alarm 82.

In addition, when the humidifier 1 is turned off, the processor 80 may be configured to discharge all the water from the circulation water tank 20 to the residual water tank 50 even when there is no low water level signal input from the circulation low water level sensor 26.

For example, when a power button (not illustrated) provided on a control panel (not illustrated) is turned off, the processor 80 may recognize that an off signal of the humidifier 1 has been input.

When the off signal of the humidifier 1 is input, the processor 80 operates the drain pump 60a in a state in which the circulation pump 40 and the supply pump 30 are turned off. Then, the water contained in the circulation water tank 20 is discharged to the residual water tank 50. When the water in the circulation water tank 20 is completely discharged, the processor 80 turns off the drain pump 60a.

As described above, when the humidifier 1 according to an embodiment of the disclosure is turned off, the humidifier 1 discharges the water in the circulation water tank 20, which circulates the humidifying member 70 and is used for humidification, to the residual water tank 50. Therefore, when the humidifier 1 is turned on again, the previously used water is not used again, and the water in the storage water tank 10 is supplied to the circulation water tank 20 to perform humidification, so that contamination of the humidifying member 70 or the circulation water tank 20 due to reuse of water may be suppressed.

In addition, the processor 80 is electrically connected to the electrolysis device 45, and is configured to monitor a current generated when the electrolysis device 45 electrolyzes water. When contaminated water is electrolyzed by the electrolysis device 45, a larger current is generated compared to the case of electrolyzing non-contaminated water.

Accordingly, the processor 80 may determine that the water in the circulation water tank 20 is not contaminated when the current generated during electrolysis in the electrolysis device 45 is less than the reference value. When the current generated by the electrolysis device 45 is more than the reference value, the processor 80 may determine that the water in the circulation water tank 20 is contaminated. When it is determined that water is contaminated, the processor 80 may output a water contamination alarm to the outside through the display 81 or the alarm 82.

In addition, the humidifier 1 may be formed to output alarms such as a water tank supplement alarm, a residual water tank emptying alarm, a water filter replacement alarm, a water contamination alarm, etc. or the state information of the humidifier to a mobile device or an external device such as a smart phone.

For example, the humidifier 1 may include a transmitter (not illustrated) configured to transmit an alarm signal generated when the processor 80 outputs the above-described various alarms to the outside. When receiving the alarm signal, the mobile device or the external device may output an alarm corresponding to the alarm signal.

The transmitter may be connected to the mobile device or the external device by wire or wirelessly. For example, the transmitter may be connected to a personal computer or a mobile device by wire or wirelessly. The mobile device may include notebook computers, tablet computers, smart phones, and the like.

Hereinafter, the operation of the humidifier 1 according to an embodiment of the disclosure having the above-described structure will be described in detail with reference to FIGS. 1 and 2.

After filling the storage water tank 10 with water, the user disposes the storage water tank 10 in the housing 3 of the humidifier 1.

Subsequently, when the user turns on the humidifier 1, the processor 80 operates the supply pump 30. When the supply pump 30 is operated, the water in the storage water tank 10 is supplied to the circulation water tank 20 through the supply pipe 16.

In this case, because the water filter 33 is disposed between the circulation water tank 20 and the supply pump 30, the water in the storage water tank 10 is supplied to the circulation water tank 20 through the water filter 33. In other words, the water in the storage water tank 10 is filtered by the water filter 33, and then supplied to the circulation water tank 20. Therefore, the water contained in the circulation water tank 20 is clean water from which sludge, bacteria, and the like in the water are firstly removed by the water filter 33.

When the water supplied to the circulation water tank 20 by the supply pump 30 reaches the high water level, the circulation high water level sensor 27 outputs a high water level signal. Then, the processor 80 turns off the supply pump 30 so that the water in the storage water tank 10 is not supplied to the circulation water tank 20.

In addition, the processor 80 operates the electrolysis device 45 to sterilize the water in the circulation water tank 20. Subsequently, the processor 80 operates the circulation pump 40 to supply the water in the circulation water tank 20 to the humidifying member 70. In addition, the processor 80 operates the fan 73 to supply wind to the humidifying element 75 of the humidifying member 70.

The water supplied to the humidifying member 70 is dispersed to the humidifying element 75 through the distributor 71. The water in the humidifying element 75 is vaporized and discharged to the outside of the humidifier 1 by the wind supplied by the fan 73.

When the water is vaporized by the humidifying element 75, organic and inorganic substances contained in the water are not vaporized. The organic and inorganic substances that have not been vaporized are recovered together with water in the recovery portion 77, and then are recovered with water to the circulation water tank 20 through the recovery pipe 79.

When the circulation pump 40 circulates the water in the circulation water tank 20 through the humidifying member 70, the organic substances and inorganic substances are concentrated in the water remaining in the circulation water tank 20, so that the concentration of the organic and inorganic substances may increase. Accordingly, the hardness of water in the circulation water tank 20 may increase.

The water in the circulation water tank 20 is reduced by the vaporization action of the humidifying element 75. When the water in the circulation water tank 20 reaches the low water level, the circulation low water level sensor 26 outputs a low water level signal. When the low water level signal is input from the circulation low water level sensor 26, the processor 80 may turn off the circulation pump 40 and turn on the drain pump 60a. Then, the residual water (water having a high hardness) in the circulation water tank 20 is discharged to the residual water tank 50 through the drain pipe 61.

When the discharge of the residual water from the circulation water tank 20 is completed, the processor 80 turns off the drain pump 60a, and then turns on the supply pump 30. Then, the water in the storage water tank 10 is supplied to the circulation water tank 20 through the supply pump 30 and supply pipe 16. At this time, because the water in the storage water tank 10 is supplied to the circulation water tank 20 through the water filter 33, clean water from which sludge, bacteria, and the like have been removed may be supplied to the circulation water tank 20.

When the circulation high water level sensor 27 of the circulation water tank 20 outputs a high water level signal, the processor 80 may control the circulation pump 40 and the fan 73 to perform humidification as described above.

When the residual water discharged from the circulation water tank 20 reaches the high water level of the residual water tank 50, the residual water high water level sensor 55 outputs a high water level signal. When the high water level signal is input from the residual water high water level sensor 55, the processor 80 may stop the operation of the humidifier 1 and then output a residual water tank emptying alarm to the outside through the display 81 or the alarm 82.

Then, the user separates the residual water tank 50 from the housing 3 of the humidifier 1, discards the residual water in the residual water tank 50, and then mounts the residual water tank 50 on the housing 3 again. Then, the processor 80 may operate the humidifier 1 again to perform humidification.

Because the humidifier 1 according to an embodiment of the disclosure having the above-described structure supplies water from the storage water tank 10 to the circulation water tank 20 through the water filter 33 disposed between the storage water tank 10 and the circulation water tank 20, clean water may be supplied to the humidifying element 75.

In this way, when humidification is performed using clean water from which sludge, bacteria, etc. have been removed while passing through the water filter 33, contamination of the humidifying element 75 may be prevented. In other words, when the water purified by the water filter 33 is supplied to the humidifying element 75, the smell from the humidifying element 75, the color change of the humidifying element 75, and the scale generated in the humidifying element 75 may be prevented or minimized.

In addition, when the water purified by the water filter 33 is stored in the circulation water tank 20, contamination of the circulation water tank 20 due to scale (or biofilm) may be minimized.

In addition, because the humidifier 1 according to an embodiment of the disclosure having the above-described structure has the residual water tank 50, the water remaining after being used for humidification (that is, residual water) may be prevented from being mixed with water contained in the storage water tank 10.

Water is vaporized while passing through the humidifying element 75, but some of the water is not vaporized, passes through the humidifying element 75, and is collected under the humidifying element 75.

On the other hand, when water is vaporized in the humidifying element 75, organic and inorganic substances in the water are not vaporized. Accordingly, the water (that is, residual water) that has passed through the humidifying element 75 has a higher concentration of organic and inorganic substances than the water before passing through the humidifying element 75. Accordingly, when the residual water is continuously circulated through the humidifying element 75, the organic and inorganic substances contained in the residual water are concentrated, and the residual water becomes water having a high concentration of organic and inorganic substances. The water having high concentrations of organic and inorganic substances may generate scale in the flow path inside the humidifier 1 and may contaminate the humidifying element 75.

The humidifier according to the prior art is configured to recover the residual water, in which the concentration of organic and inorganic substances is increased by passing through the humidifying element, to the storage water tank. Therefore, the water in the storage water tank is mixed with the residual water and supplied to the humidifying element. Accordingly, in the humidifier according to the prior art, as the number of uses increases, the concentration of organic and inorganic substances contained in the water in the storage water tank increases.

However, the humidifier 1 according to an embodiment of the disclosure may be configured to discharge the residual water having a high concentration of organic and inorganic substances by circulating through the humidifying element 75 to the residual water tank 50 through the drainage member 60 and to supply the water in the storage water tank 10 to the circulation water tank 20 so that the circulation water tank 20 supplies the water to the humidifying element 75. Accordingly, in the humidifier 1 according to an embodiment of the disclosure, the residual water in the circulation water tank 20 in which organic and inorganic substances are high concentration while circulating the humidifying element 75 is not mixed with the water in the storage water tank 10.

Accordingly, in the humidifier 1 according to an embodiment of the disclosure, the concentration of organic and inorganic substances in the water in the storage water tank 10 is not changed, and the concentration of the initially supplied state is maintained as it is.

On the other hand, because the water contained in the circulation water tank 20 circulates through the humidifying element 75, the concentration of organic and inorganic substances increases as the number of uses increases. However, when the water in the circulation water tank 20 is used up to a predetermined number of times, it is discharged to the residual water tank 50, and the water in the storage water tank 10 is supplied again to the circulation water tank 20. Accordingly, as the number of uses increases, the concentration of organic and inorganic substances in the water in the circulation water tank 20 increases to a certain value, and then falls back to the initial concentration.

Change in the concentration of organic and inorganic substances in water may be found by measuring the hardness of water. The disclosers tested a change in hardness of water in a humidifier according to the prior art and a change in hardness of water in a humidifier 1 according to an embodiment of the disclosure depending on the number of uses. The results are shown in FIG. 11.

Figure 11:
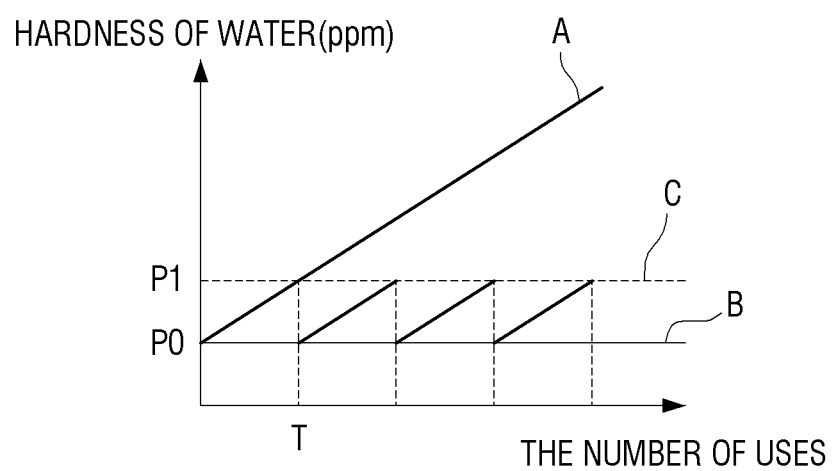
FIG. 11 is a graph illustrating a change in hardness of water supplied to a humidifying element according to the number of uses of a humidifier in the humidifier according to an embodiment of the disclosure and the humidifier according to the prior art.

FIG. 11 is a graph illustrating a change in hardness of water supplied to a humidifying element according to the number of uses of a humidifier in the humidifier according to an embodiment of the disclosure and the humidifier according to the prior art.

In FIG. 11, the horizontal axis represents the number of uses of the humidifier, and the vertical axis represents the hardness of water (ppm). The number of uses indicates the number of times water is supplied to the humidifying element. In addition, line A represents the change in the hardness of water in the humidifier according to the prior art, line B represents the change in the hardness of water in the storage water tank 10 of the humidifier 1 according to an embodiment of the disclosure, and line C represents the change in the hardness of water in the circulation water tank 20 of the humidifier 1 according to an embodiment of the disclosure.

As can be seen from line A of FIG. 11, in the humidifier according to the prior art, the hardness of water supplied to the humidifying element gradually increases as the number of uses increases.

However, in the humidifier 1 according to an embodiment of the disclosure, as can be seen from line B of FIG. 11, even when the number of uses increases, the hardness of water in the storage water tank 10 does not change.

On the other hand, the hardness of water in the circulation water tank 20 of the humidifier 1 according to an embodiment of the disclosure increases to a certain value P1 as the number of uses increases, and then falls back to the initial state P0, as can be seen from line C of FIG. 11. In FIG. 11, the time T when the hardness of water in the circulation water tank 20 decreases is the time when the water in the circulation water tank 20 is discharged to the residual water tank 50 and the water in storage water tank 10 is supplied to the circulation water tank 20 again.

As described above, in the humidifier 1 according to an embodiment of the disclosure, even when the number of uses increases, the concentration of organic and inorganic substances in water supplied to the humidifying element 75 may be maintained below a predetermined value. Therefore, even when the humidifier 1 according to an embodiment of the disclosure is used for a long time, contamination of the humidifying element may be minimized, thereby maintaining a clean and hygienic humidification state.

According to the humidifier according to an embodiment of the disclosure having the above-described structure, because water is supplied from the storage water tank to the circulation water tank through the water filter, clean water may be supplied to the humidifying element. Accordingly, contamination of the humidifying member may be suppressed, so that the cleaning interval of the humidifier may be lengthened.

In addition, because the humidifier according to an embodiment of the disclosure having the above-described structure has a residual water tank, the water remaining after being used for humidification may be prevented from being mixed with the water contained in the storage water tank and used for humidification. Accordingly, contamination of the humidifying member may be suppressed, so that the cleaning interval of the humidifier may be lengthened.

In the above description, a humidifier having only a humidifying function has been described as an example. However, the disclosure may be applied to all home appliances having a humidifying function, such as a humidifier combined air purifier with a humidifying function in addition to the air cleaning function.

Hereinabove, the disclosure has been described as an illustrative method. It is to be understood that terms used herein are provided to describe the disclosure rather than limiting the disclosure. Various modifications and alternations of the disclosure may be made according to the contents described above. Therefore, the disclosure may be freely practiced without departing from the scope of the claims unless additionally mentioned.

What is claimed is:

1. A humidifier comprising:
    a storage water tank;
    a circulation water tank;
    a circulation low water level sensor to detect a water level in the circulation water tank reaching a predetermined low water level;
    a supply pump configured to supply water from the storage water tank to the circulation water tank;
    a circulation pump configured to supply water from the circulation water tank to be vaporized;
    a residual water tank;
    a drainage member configured to be controlled to discharge water from the circulation water tank to the residual water tank; and
    a processor configured to control the drainage member to discharge water from the circulation water tank to the residual water tank based on the circulation low water level sensor detecting that the water level in the circulation water tank reaches the predetermined low water level.

2. The humidifier as claimed in claim 1, wherein the drainage member includes a drain pump having an inlet connected to the circulation water tank.

3. The humidifier as claimed in claim 1, wherein
    the circulation water tank is located higher than the residual water tank, and
    the drainage member comprises a drain valve to discharge the water from the circulation water tank to the residual water tank.

4. The humidifier as claimed in claim 1, further comprising:
    a supply pipe connecting the storage water tank and the circulation water tank; and
    a water filter disposed in the supply pipe.

5. The humidifier as claimed in claim 4, wherein the processor is configured to
    determine when a flow rate of water supplied to the circulation water tank by the supply pump is reduced by 50% to 80% compared to an initial flow rate as a time to replace the water filter, and
    to output a water filter replacement alarm based on determining that the flow rate of water supplied to the circulation water tank by the supply pump is reduced by 50% to 80% compared to the initial flow rate as a time to replace the water filter.

6. The humidifier as claimed in claim 4, wherein the supply pipe includes:
    a filter mounting portion in which the water filter is detachably disposed, and a bypass pipe disposed on one side of the filter mounting portion so that, when the water filter is not disposed on the filter mounting portion, the water in the storage water tank is supplied to the circulation water tank through the bypass pipe.

7. The humidifier as claimed in claim 1, further comprising:
a sterilization device disposed in the circulation water tank and configured to sterilize water contained in the circulation water tank.

8. The humidifier as claimed in claim 7, wherein the sterilization device includes an electrolysis device.

9. The humidifier as claimed in claim 8, wherein the processor is configured to output a water contamination alarm when a current generated in the electrolysis device is more than a reference value.

10. The humidifier as claimed in claim 8, wherein the sterilization device further includes an ultraviolet lamp or an ultraviolet filter.

11. The humidifier as claimed in claim 1, further comprising:
a circulation high water level sensor to detect a water level in the circulation tank reaching a predetermined high water level,
wherein the processor is configured to control the circulation pump to supply water to be vaporized, based on the circulation high water level sensor detecting the water level in the circulation tank reaching the predetermined high water level.

12. The humidifier as claimed in claim 1, further comprising:
a humidifying member configured to receive, and vaporize, the water supplied from the circulation water tank; and
a sub-sterilization device disposed between the circulation pump and the humidifying member and configured to sterilize water being supplied from the circulation water tank before being received by the humidifying member.

13. The humidifier as claimed in claim 1, wherein the storage water tank is formed separately from the residual water tank.

14. The humidifier as claimed in claim 1, wherein the residual water tank is formed integrally with the storage water tank.

15. The humidifier as claimed in claim 14, further comprising:
a residual water high water level sensor to detect a water level in the residual water tank reaching a predetermined residual water high water level,
wherein the processor is configured to stop an operation of the humidifier and output a residual water tank emptying alarm to an outside of the humidifier, based on the residual water high water level sensor detecting that the water level in the residual water tank reaches the predetermined residual water high level.

16. The humidifier as claimed in claim 15, wherein
a partition wall is disposed between the residual water tank and the storage water tank, and
the partition wall includes an overflow prevention part configured so that, when water in the residual water tank exceeds a full water level, the water in the residual water tank is discharged to the storage water tank through the overflow prevention part.

17. The humidifier as claimed in claim 1, wherein
a capacity of the circulation water tank and a capacity of the residual water tank are 10% to 30% of a capacity of the storage water tank, respectively.

18. The humidifier as claimed in claim 1, wherein
the processor is configured to control the drainage member to discharge water contained in the circulation water tank to the residual water tank when an off signal of the humidifier is input.

19. The humidifier as claimed in claim 1, wherein
the processor is configured to shut off an operation of the drainage member and to operate the supply pump to supply water from the storage water tank to the circulation water tank when the water in the circulation water tank is completely discharged.

20. A humidifier comprising:
a circulation water tank;
a circulation pump configured to supply water from the circulation water tank to be vaporized by the humidifier;
a residual water tank;
a drainage member, which is a pump or valve, configured to be controlled to discharge water from the circulation water tank to the residual water tank; and
a processor configured to control the drainage member to discharge water from the circulation water tank to the residual water tank when a water level in the circulation water tank reaches a predetermined low water level.

* * * * *